Dec. 26, 1933.        D. D. HOWATT        1,940,911
AUTOMOBILE TOP
Filed Nov. 25, 1930        6 Sheets-Sheet 1
Fig. 1
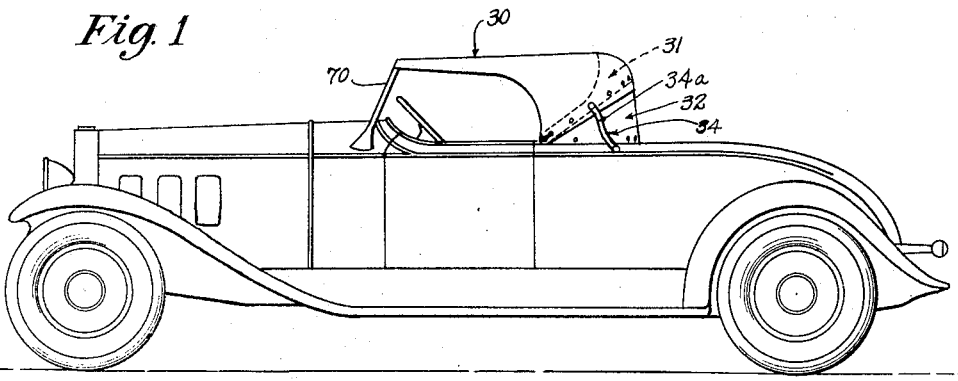
Fig. 2
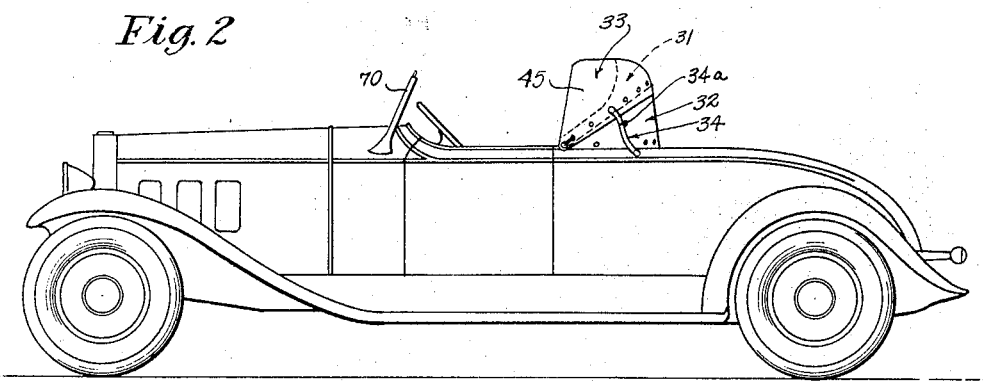
Fig. 3
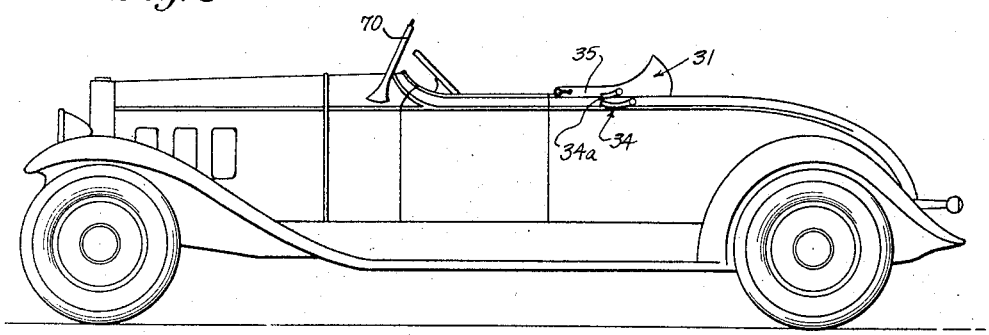
Inventor
Douglas D. Howatt.
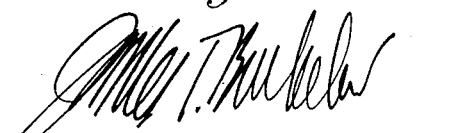
Attorney.

Dec. 26, 1933.  D. D. HOWATT  1,940,911
AUTOMOBILE TOP
Filed Nov. 25, 1930  6 Sheets-Sheet 2

Inventor
Douglas D. Howatt.
Attorney.

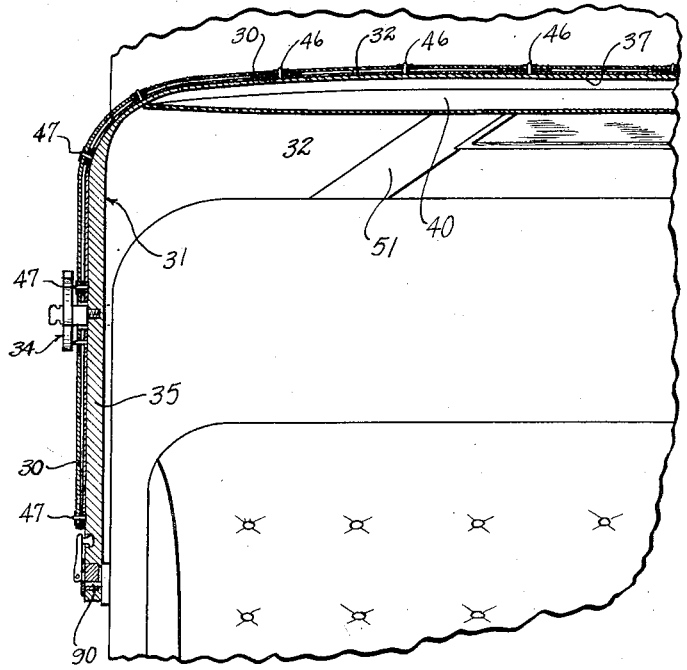
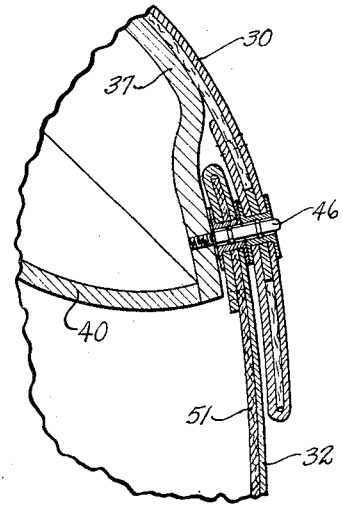
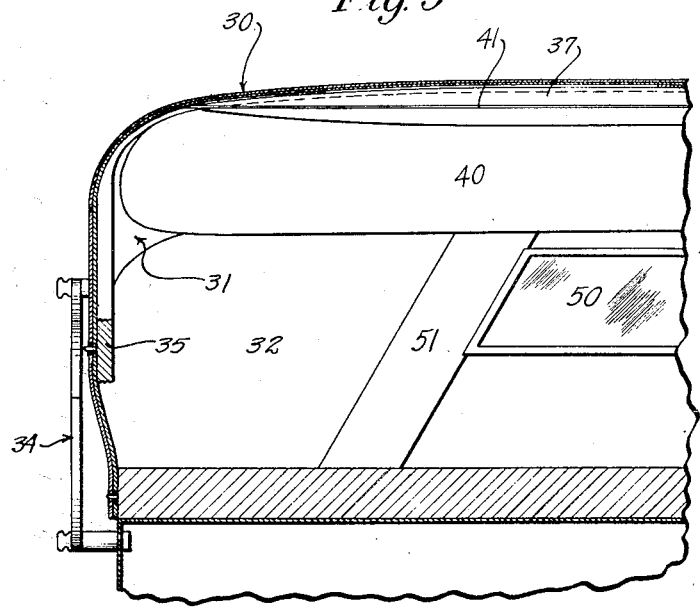

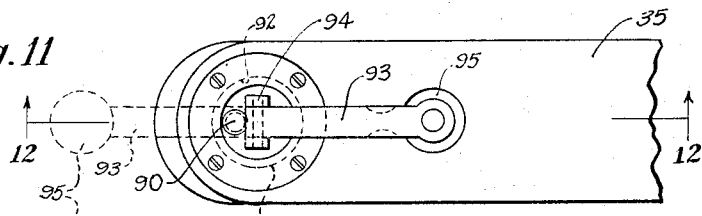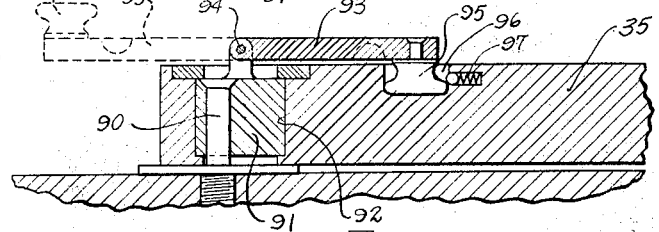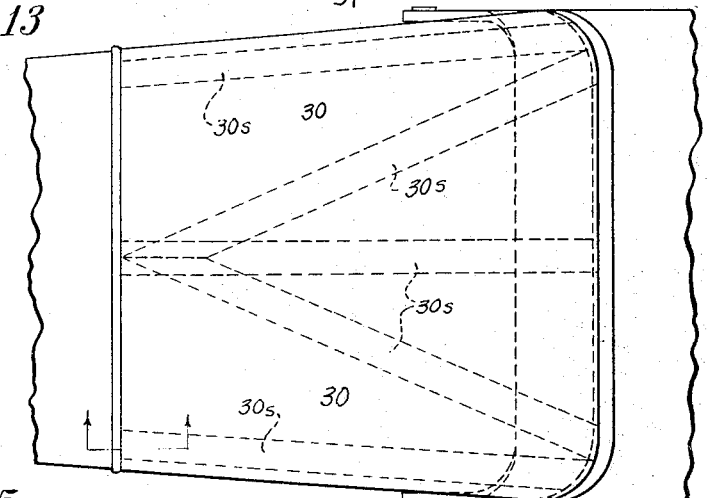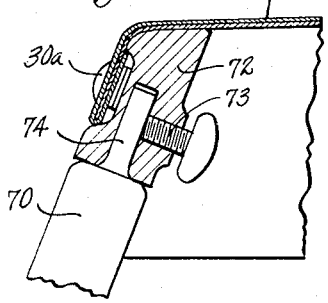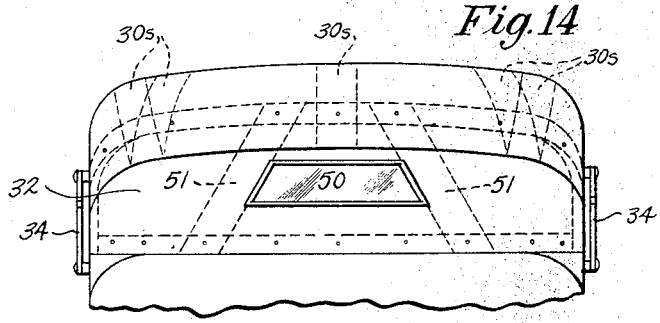

Dec. 26, 1933.  D. D. HOWATT  1,940,911
AUTOMOBILE TOP
Filed Nov. 25, 1930  6 Sheets-Sheet 5

Inventor
Douglas D. Howatt.

Attorney.

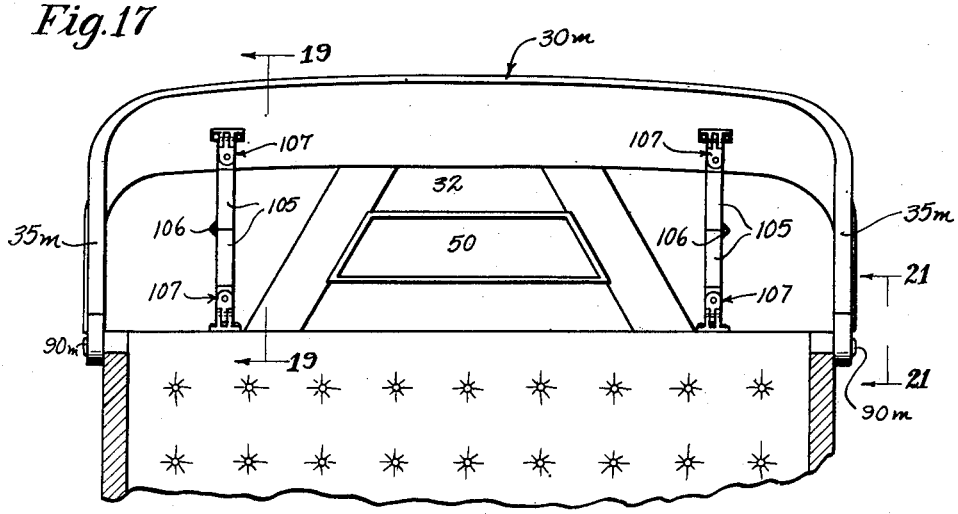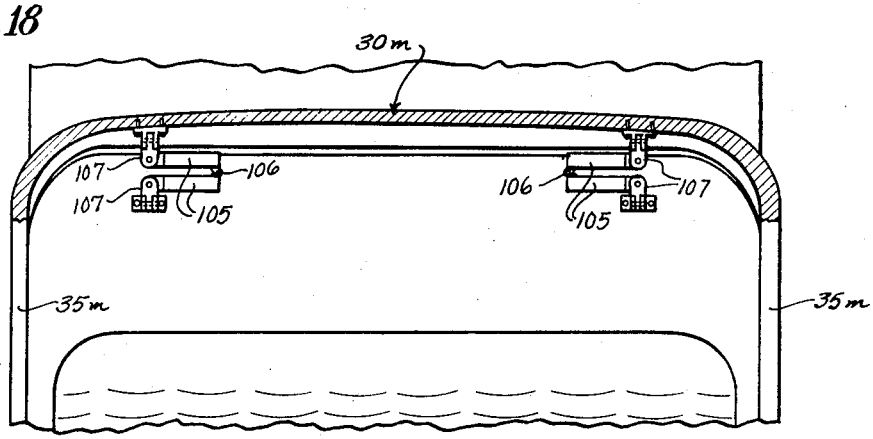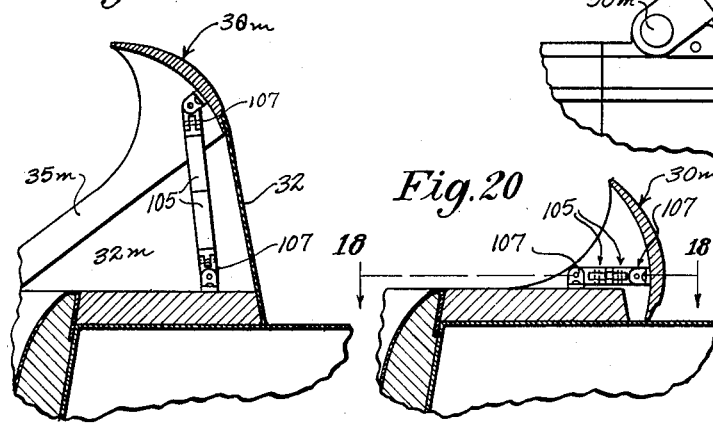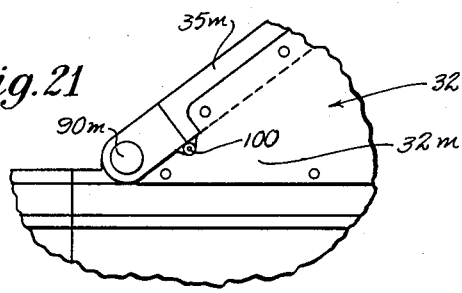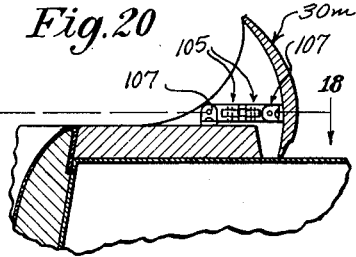

Patented Dec. 26, 1933

1,940,911

UNITED STATES PATENT OFFICE 1,940,911

AUTOMOBILE TOP

Douglas D. Howatt, Los Angeles, Calif., assignor of one-half to James T. Barkelew, Los Angeles, Calif.

Application November 25, 1930
Serial No. 498,039

2 Claims. (Cl. 296—99)

This invention has to do with tops for vehicles such as automobiles; and a general object of the invention is the provision of a folding top capable of being used in various different manners to give several different mechanical and design effects; to provide a top which has several possible arrangements and positions, each of which gives a desirable mechanical effect and pleases the eye; and to provide a top which is easily manipulated, extended, folded and changed from one position to another. There are many other objects of the invention, among which is that of providing simplicity of mechanical structure and design.

The top structure which I shall hereinafter describe embodies only a single bow and one set of supporting means for the bow. This single bow is so supported that the fabric canopy which stretches from the bow to the forward windshield is not necessarily used to support the bow, as in all tops of which I am aware. As a consequence, the top canopy may or may not be used, at the pleasure of the user.

In the structure as here illustrated, it will, of course, be understood that the mechanical structure is capable of being made into design effects other than those illustrated as typical. The general appearance when the top canopy is in place, is that of a low flat top of very pleasing lines. In the illustrations the top is shown designed and applied as a collapsible roadster top, but it will be understood that it may be designed for or applied to a vehicle of any type where a collapsible top is desired.

With the top canopy removed, the structure is made either into a "cabriolet" design, or what I shall term a "semi-cabriolet". For the purpose of effecting the cabriolet arrangement, and for other purposes as will appear, the single bow is, in its transverse portion, made box-like in structure; and one wall of this box structure may be swung forward to provide the forward extension of the bow desirable for the cabriolet effect. The box structure of the bow also serves the purpose of storing away the fabric canopies and curtains when not in use.

Lastly, with the fabric canopies or curtains removed, the single bow may be lowered to a position lying very flat on the body of the vehicle, presenting a very pleasing folded top appearance.

To explain better the invention I proceed to detailed descriptions of typical forms and embodiments thereof. It will be understood that my complete description of these specific forms is not intended as a limitation upon the invention, because the invention may, as will be realized, be applied in many different mechanical and design forms.

In the drawings:

Figure 1 is a side elevation of an automobile equipped with my top showing the top fully extended;

Fig. 2 is a similar view showing the cabriolet effect;

Fig. 3 is a similar view showing the top completely folded;

Fig. 8 is a section taken as indicated by the line 8—8 of Fig. 4;

Fig. 9 is a section taken as indicated by the line 9—9 of Fig. 4;

Fig. 10 is an enlargement of certain portions of the section of Fig. 4;

Fig. 11 is an enlarged side elevation of the pivotal mounting which is used at each side of the bow;

Fig. 12 is a section on line 12—12 of Fig. 11;

Fig. 13 is a plan of the top in its completely extended position;

Fig. 14 is a rear elevation of the top in its extended position;

Fig. 15 is a sectional detail showing a mounting of the upper canopy on the forward windshield bows;

Fig. 17 is a front elevation of the bow structure showing a modified means for supporting the bow;

Fig. 18 is a plan section showing the form of Fig. 17 when the bow is folded down on the body, this view being taken as indicated by line 18—18 on Fig. 20;

Fig. 19 is a vertical section on line 19—19 of Fig. 17 showing the bow elevated;

Fig. 20 is a similar view showing the bow folded down;

Fig. 21 is a fragmentary detail view taken as indicated by the line 21—21 of Fig. 17.

Figure 4:
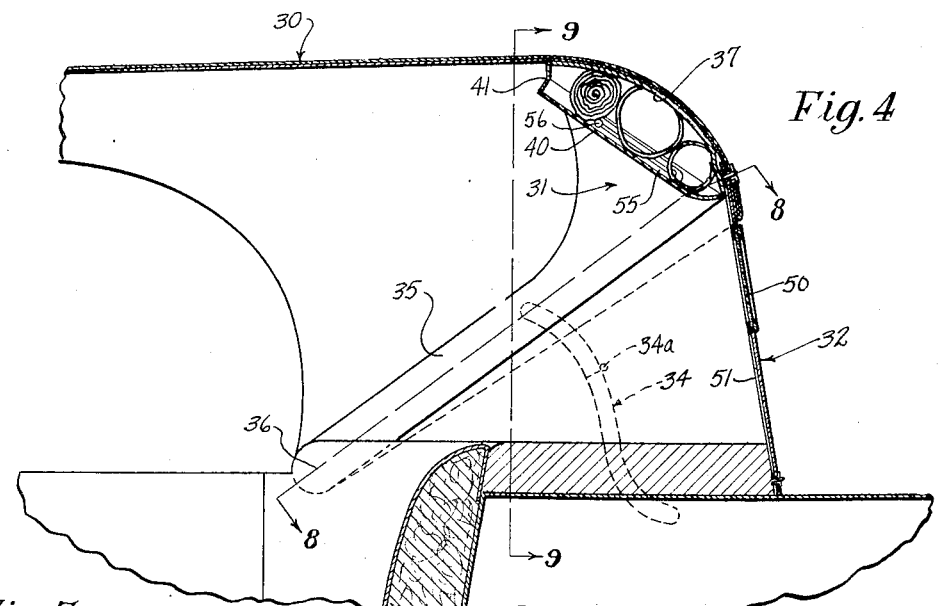
Fig. 4 is an enlarged fragmentary vertical central section showing the top in its fully extended arrangement.

In the drawings the numeral 30 designates generally the top canopy, the numeral 31 the bow, the numeral 32 the back curtain and the numeral 33 the fabric canopy or curtain of the cabriolet extension. Supports for the bow, here shown in the general design of cabriolet braces, are generally indicated by numeral 34.

Figure 6:
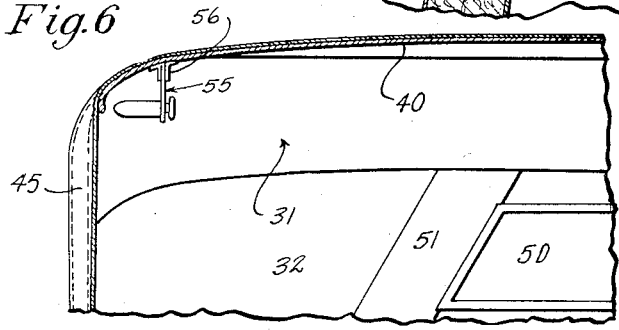
Fig. 6 is a fragmentary vertical cross section on line 6—6 of Fig. 5.

The single bow structure herein illustrated has longitudinal portions or legs 35 pivoted on the automobile body at 36, the pivot preferably being constructed in the manner shown in Figures 11 and 12, to be explained hereafter. The transverse portion of the bow, which may, if desired, be made integral with legs 35, comprises primarily a transverse web 37 curved from side to side (curved in the aspect seen in Figures 6, 8 and 9) and also curved in longitudinal section (the aspect seen, for instance, in Figure 4). The transverse curve from side to side is such as to give the top canopy a transverse curvature from side to side, sufficient to keep the top canopy from hanging hollow and to give the top canopy a curvature causing it to be stretched tightly in a transverse direction when it is stretched tightly longitudinally, as will be described hereafter.

The longitudinal curvature of the bow (the curvature seen, for instance, in Figure 4) is such as to give the top canopy a smoothly joining curve with the back canopy 32. The whole bow, as described, may be made of a single piece of stamped or otherwise formed metal, or may be made of any suitable substance, either in a single piece, or in several pieces made up.

The curvature of transverse web 37 of the bow lends itself readily to formation of a box, by utilizing a cover plate 40 hinged along its forward edge at 41 to the forward edge of the bow. This cover plate is shaped as is best shown by such sections as Figure 4 and Figure 8; and when in the closed position, such as shown in Figure 4, it forms, with the bow web, a box-like structure which suffices as storage for the various curtains and canopies, and also materially strengthens and stiffens the bow.

Figures 5, 7:
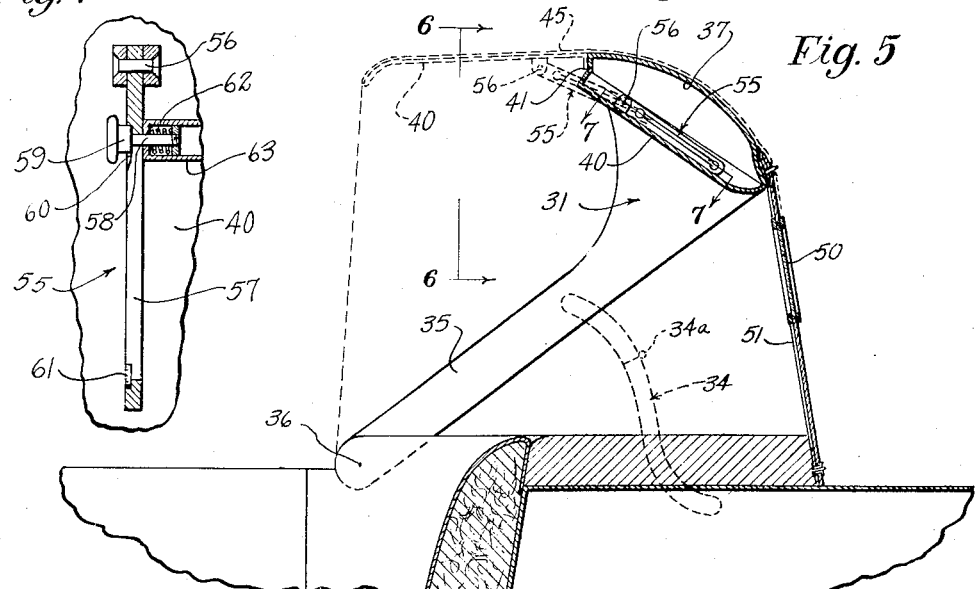
Fig. 5 is a similar view illustrating the cabriolet and similar cabriolet effects.
Fig. 7 is a detail section taken as indicated by line 7—7 of Fig. 5.

The cover plate 40, hinged at its forward edge may be thrown around forwardly to the position shown in dotted lines in Figure 5, to form a forward curved extension of the bow. Over this forward extension a cabriolet canopy 45 may be placed; this canopy being of such form that it covers the bow and the extension plate 40 and comes down on the sides to complete the cabriolet effect, as shown in Fig. 2.

Either the cabriolet canopy or the top canopy 30 is secured along its rear edges on rows of fastening buttons or studs, such as are shown at 46 in Fig. 10. A row of these studs is mounted on the rear face of the lower edge of the bow transverse portion, as shown in Fig. 8. This row of studs is also extended down the lengths of the bow legs as at 47, and shown particularly in Fig. 8. The back curtain 32 is also secured at its upper and forward edges to these same rows of studs 46 and 47; the lower edge of the back curtain being secured to the body in any conventional manner. The back curtain may have window 50 and will be provided with reinforcing straps 51 to give it strength to stand the strain put upon it when stretched into position.

To hold cover plate 40 in either of its illustrated positions a pair of pivoted braces 55 is provided. Each of these braces is pivoted at 56 to cover plate 40 and has a longitudinal slot 57 in which a spring pressed pin 58 rides. This pin has a head 59 adapted to enter either of two depressions 60 and 61 in the brace member 57. Pin 58 is urged by a spring 62 so as to urge the head into either of these depressions; and the headed pin with its spring mounting, is mounted in a small cylinder 63 or any other suitable mounting which, in turn, is mounted directly on a bow web 37. When cover plate 40 is in the position shown in Figure 5, pin head 59 engages in depression 60, and the tension of spring 62 is sufficient to keep the pin head from being forced out of that recess by the weight of the cover plate. A pull on the cover plate will throw it from the position shown in full lines in Fig. 5 to the position shown in dotted lines. And when reaching the position shown in dotted lines the brace member 55 will then occupy the position shown in dotted lines and the pin head 59 will enter recess 61. This recess has no sloping sides, so the braces and cover plate are positively held in extended position. To return the cover plate to the full line position of Fig. 5, it is necessary that pin head 59 be manually removed from recess 61.

With the cover plate thus positively held in its extended dotted line position of Fig. 5, the cabriolet canopy can be stretched tightly, and the extended cover plate will support it in that stretched condition. If the cabriolet canopy is not desired, it may be removed, folded and placed in the enclosure formed in the bow when cover plate 40 is in its normal or folded position. The top canopy 30 may likewise be stored in the bow.

The back curtain 51 may or may not be taken off to lower the bow to the position shown in Fig. 3. To raise the bow from the position shown in Fig. 3 to the position shown in the other views, it is only necessary to manipulate the supporting members 34, as will be well understood. These members have a pivoted joint at 34a and act, in the "movement over center" manner usual to such pivotally interconnected links, to come to a final position where tension of the back member, tending to pull the bow downwardly, holds the interpivoted members 34 securely in their extended positions. Also, by manipulating the supporting members 34 the back curtain may be stretched very tightly.

Figure 16:
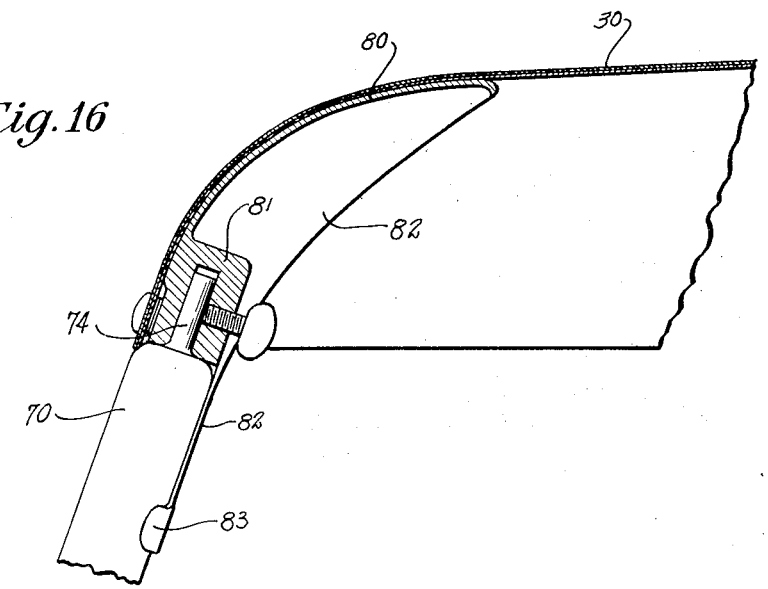
Fig. 16 is a similar detail showing a modification.
Figure 16A:
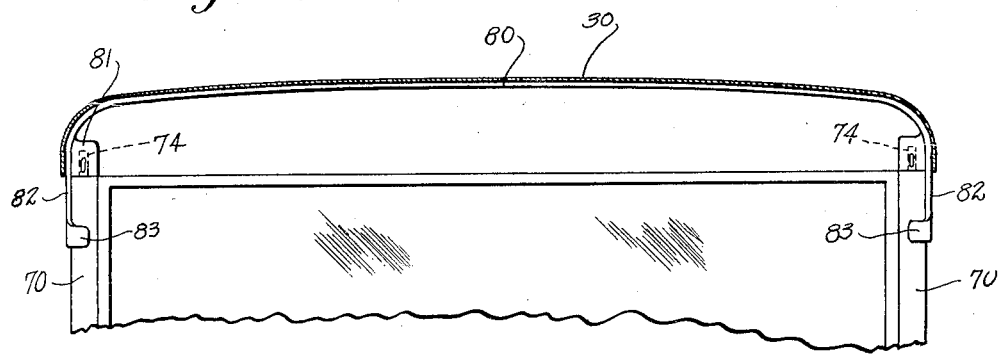
Fig. 16a is a rear elevation of the structure shown in Fig. 16.

If it is desired to use the top canopy 30 that canopy is secured to the lines of studs 46 and 47; and its forward end is secured to the windshield posts 70. This forward securing of the top canopy may be of any type. I have shown the top canopy releasably buttoned at 30a to a member 72 which may, by the use of set screws 73, be secured to studs 74 of the windshield posts 70. Member 72 is in the nature of a transverse member, as will be well understood. Its sectional configuration may be as desired. In Fig. 15, I have shown a simple cross bar. In Figs. 16 and 16a I show another form wherein, instead of a simple cross bar, I employ a curved web 80, which may be made of sheet metal and provided with lugs 81 to take the windshield studs 74. The web 80 has a transverse curvature as shown in Fig. 16a and also has a longitudinal curvature, as shown in Fig. 16. At each end of the web 80 there are vertical webs 82 extending down at opposite sides of the windshield posts 70, and having lugs or ears 83 bearing against the windshield post in such a manner as to brace the web against the rearward pull due to the tension of top canopy 30. The structure just described has the advantage of giving the forward end of the top canopy a smooth and long curve at its point of attachment to the windshield; also the advantage of giving the top canopy a transverse curvature at its forward end like it has at its rearward end at the bow; also the advantage of giving the top canopy a solid support for some little distance rearwardly of the windshield. The web 80 of the structure just described may extend rearwardly a considerable distance from the windshield; and thus the directly unsupported portion of the top canopy 30, between the rear edge of 80 and the forward edge of the bow, is materially decreased.

With this stretch materially decreased and held to a transverse curvature, the top canopy, although not directly supported by intermediate bows, is strongly supported against deformation by the elements.

When the top canopy is put into position, the bow is first moved forwardly so that the top canopy may be fastened while unstretched; and then the bow is forcibly moved rearwardly to stretch the top canopy. This movement of the bow is preferably accomplished by the mechanism shown in Figs. 11 and 12. This mechanism is in effect a device for changing the effective lengths of the bow legs in their extent from the pivot points. As will be readily understood, other arrangements may be used; but I find the arrangement shown in Figs. 11 and 12 very effective.

In these two figures the bow leg is shown pivoted on a pivot pin 90, but indirectly, through the medium of an eccentric 91, so that the relationship of the bow to the pivot may be altered. Thus, an eccentric 91 is mounted on pivot pin 90, the eccentric being mounted in a bore 92 in the bow. The folding handle 93 is connected through a hinge 94 with the eccentric so that the handle may be thrown between the full line and dotted line positions. The handle has a knob 95 which, in the full line position, rests in a recess 96 and is held therein by spring detent 97. In this position of the handle, eccentric 91 is in such position as to throw the bow to its limiting rearward position with reference to pivot 90; in the other position of the handle the bow is thrown forward by an amount equal to the full throw of the eccentric, which throw is large enough to loosen the top canopy for placement or removal, and to pull the top canopy taut when the bow is moved rearwardly. The top canopy is provided with fabric brace strips 30s to give it tensile strength.

It will be seen that my top structure, as now has been described, comprises a single bow, with one means to support the bow independently of the top canopy; so that the single bow, with its back and side curtains, with its cabriolet or semi-cabriolet effects, or with any other arrangement or effect which may be supported on the bow, may be utilized without the necessity of utilizing the top canopy. Then this single bow has associated with it another means for moving the bow to loosen and stretch the top canopy when desired.

In Figures 17 and following I illustrate modified forms. Here the single bow is indicated generally at 30m with its legs 35m. These legs are pivoted at 90m (see particularly Fig. 21). In this form of the invention a knuckle joint 100 is substituted for the eccentric arrangement of Figures 11 and 12; the bow leg 35m has a knuckle hinge 100 so placed with relation to the longitudinal axis of the bow leg that when the parts are in the position of Figure 21 the longitudinal compression on the leg tends to hold the leg in the position illustrated; and the side portion of the back curtain 32, shown at 32m, tends to hold the bow leg down and keep it from breaking at the hinge. It will be readily understood how the bow may be moved forward by breaking the knuckle at 100; and how the top canopy can be tightened by turning the knuckle around to its set position of Figure 1.

The bow 30m is, in these figures, shown without the box or enclosure formation heretofore described; but such formation, or any other suitable one may be utilized.

Instead of using the cabriolet supports as heretofore described, the form now under discussion shows knuckle jointed vertical members 105 jointed at a knuckle hinge 106 in such a manner that the members may be extended or broken as illustrated. The upper end of the upper member of each pair is connected with the bow through the medium of a universal or double pivot joint 107; and the lower end of the lower member of each pair is likewise connected with the body by a similar universal or double pivot joint. These universal joints allow knuckle members 105 to fold upon each other and also to move down to the horizontally folded position shown in Figures 18 and 20, the upper pivotal joints 107 moving downwardly to a point somewhat rearwardly of the fixed positions of the lower pivotal joints 107.

The modifications described are merely indicative of various modifications which may be made in the structure and arrangement of devices embodying my invention. As will be readily understood, the invention is not necessarily limited to any of the specific details herein described, all of which may be varied as desired and still remain within the scope of my invention as expressed in the following claims.

I claim:

1. In a vehicle top structure, a single bow having a transversely extending web and longitudinally extending legs pivoted at their ends to the vehicle body, the web being relatively wide in a longitudinal direction, a rigid web extension member presenting a rigid and continuous web extension surface of substantially the same transverse extent as the bow web and also relatively wide in a longitudinal direction, said extension member mounted and supported exclusively on the bow and adjustably movable thereon between a position forming a continuous forward extension of the bow web and a position inside and under the web, a back curtain attached at its lower edge to the vehicle body and at its upper edge to the bow web, means independent of the web extension to support the bow on the vehicle body and to stretch the back curtain, means for rigidly securing the extension member in its forward position and a removable canopy attachable to the bow and to the extension when in its forward bow extending position, the forward edge of said canopy being supported exclusively by the extension.

2. In a vehicle top structure, a single bow mounted on the vehicle body and having a transversely extending web, and the web being rigid and relatively wide and curved in a longitudinal direction, a rigid web extension member presenting a rigid and continuous web extension surface of substantially the same transverse extent as the bow web and also relatively wide in a longitudinal direction, said extension member mounted and supported exclusively on the bow and adjustably movable thereon between a position forming a continuous forward extension of the bow web and a position inside and under the web, means for rigidly securing the extension member in its forward position, and a removable canopy attachable to the bow and to the extension when in its forward position, the forward edge of said canopy being supported exclusively by the extension.

DOUGLAS D. HOWATT.